(12) United States Patent
Chujo et al.

(10) Patent No.: US 6,236,171 B1
(45) Date of Patent: May 22, 2001

(54) IMAGE READING DEVICE

(75) Inventors: Hideki Chujo, Kyoto; Takashi Nakanishi, Fujisawa; Ikuo Kinoshita, Kyoto, all of (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/509,740

(22) PCT Filed: Oct. 1, 1998

(86) PCT No.: PCT/JP98/04454

§ 371 Date: Mar. 31, 2000

§ 102(e) Date: Mar. 31, 2000

(87) PCT Pub. No.: WO99/18492

PCT Pub. Date: Apr. 15, 1999

(30) Foreign Application Priority Data

Oct. 2, 1997 (JP) .................................................... 9-269473

(51) Int. Cl.$^7$ ................................ G06F 1/26; G06F 3/00; H01R 43/00
(52) U.S. Cl. ............................. 318/17; 318/563; 318/478
(58) Field of Search ............................ 318/17, 563, 640, 318/652, 671, 478, 479, 480; 399/75, 107, 110, 130, 411

(56) References Cited

U.S. PATENT DOCUMENTS 5,907,748 * 5/1999 Kawana ............................... 399/111
5,909,603 * 6/1999 Suzuki et al. ........................ 399/13
5,987,276 * 11/1999 Kumar et al. ....................... 399/90

FOREIGN PATENT DOCUMENTS

| 03074068A | 3/1991 | (JP) . |
| 3-127945 | 12/1991 | (JP) . |
| 08185931A | 7/1996 | (JP) . |
| 09148035A | 6/1997 | (JP) . |
| 9197740 | 7/1997 | (JP) . |
| 09319669A | 12/1997 | (JP) . |

* cited by examiner

*Primary Examiner*—Bentsu Ro
(74) *Attorney, Agent, or Firm*—Dickstein Shapiro Morin & Oshinsky LLP

(57) ABSTRACT

The information processing device includes a first device (31) supplied with power and a second device (32) supplied with power from the first device (31) when connected to the first device (31). The information processing device includes a detection portion (121-1, 121-n, 221-1, 221-n) detecting the attachment/detachment of the second device (32) and a supply portion (121-2, 221-2) supplying power to the second device (32), and the first device (31) includes a control portion (151) controlling the supply of the power by the supply portion (121-2, 221-2) according to the result of detection by the detection portion (121-1, 121-n, 221-1, 221-n). As the supply of the power by the supply portion (121-2, 221-2) is controlled according to the result of the detection by the detection portion (121-1, 121-n, 221-1, 221-n), the electric shock on an internal circuit of the second device (32) at the time of attachment/detachment of second device (32) can be prevented.

9 Claims, 10 Drawing Sheets

IMAGE READING DEVICE

TECHNICAL FIELD

The present invention relates to image reading devices and more particularly to an image reading device including an image reading unit and a sheet feeding device attachable/detachable to/from the image reading unit, in which power is supplied from the image reading unit to the sheet feeding device only when the image reading unit and the sheet feeding device are securely engaged, whereby damage on an internal circuit of the sheet feeding device caused by an electric shock at the time of attachment/detachment is prevented.

BACKGROUND ART

In recent years, the information processing devices have become more multi-functional and one information processing device has become utilized for various purposes. In an image scanner, for example, a main scanner body with a reading portion for reading an image of an original is engaged in an attachable/detachable manner with a feeder feeding the original. A user can utilize the image scanner as a handy scanner by using the main scanner body in a detached state from the feeder.

In this case, if power is supplied to the side of the main scanner body via a code, for example, the feeder can be powered through a connector from the side of the main scanner body with no additional code provided for power supply to the feeder. With such an arrangement, the connection of the codes in use becomes simple and the device can be used more conveniently.

When power is supplied from the main scanner body to the feeder, however, if a power supply switch on the side of the main scanner body is left in an on-state at the time of attachment/detachment of the feeder to/from the main scanner body, an electric shock will be caused on the side of the feeder at the time of attachment/detachment and the internal circuit on the side of the feeder can be damaged.

To avoid such problem, a circuit component capable of enduring such electric shock may be mounted on the side of the feeder. This arrangement, however, may lead to a complexity of the structure on the feeder side and increase in cost.

Alternatively, it is possible to oblige the user to turn off the power supply switch on the side of the main scanner body at the time of attachment/detachment of the main scanner body to/from the feeder. Then, the damage on the circuit due to an electric shock caused by an unstable state of electrical connection of the connector at the time of attachment/detachment can be prevented. This solution, however, affects the operability of the device. In addition, according to this solution, the circuit would not be protected when the user attaches/detaches the feeder to/from the main scanner body by mistake while the power supply switch is in an on-state.

The present invention is made to solve the above described problems and an object of the present invention is to provide an image reading device capable of protecting an internal circuit at a low cost from generation of an electric shock at the time of attachment/detachment of the image reading unit and the sheet feeding device.

DISCLOSURE OF THE INVENTION

According to one aspect of the present invention, an image reading device includes an image reading unit being supplied with power and a sheet feeding device being supplied with power from the image reading unit when being mounted on the image reading unit. The image reading device includes a detection portion detecting the attachment/detachment of the sheet feeding device and a supply portion supplying power to the sheet feeding device, the sheet feeding device includes a drive portion feeding a sheet of paper and so on, and the image reading unit includes a control portion controlling the supply of power from the supply portion according to the result of detection by the detection portion and a drive signal output portion supplying a drive signal as an output to the drive portion.

As the control portion provided in the image reading unit controls the supply of power from the supply portion according to the result of detection by the detection portion, the image reading unit can be operated to start the supply of the power to the sheet feeding device when the sheet feeding device is mounted on the image reading unit. In addition, the image reading unit can be operated to stop the supply of the power to the sheet feeding device when the sheet feeding device is detached from the image reading unit. Thus, the internal circuit of the device can be protected from the generation of an electric shock at the time of attachment/detachment of the two devices.

Preferably the image reading unit includes a first connector and the sheet feeding device includes a second connector connected to the first connector. The supply portion includes a first terminal provided on the first connector supplying the power to the sheet feeding device and a second terminal provided on the second connector, connected to the first terminal and receiving the supply of the power.

As the supply portion is constituted of the first terminal on the first connector and the second terminal on the second connector, the cost would not increase significantly.

Preferably, the detection portion includes a third terminal provided on the first connector and connected to a first reference potential and a fourth terminal connected to a second reference potential of a different level from the first reference potential with its potential changed from the second reference potential when the second connector is connected, a fifth terminal provided on the second connector and connected to the third terminal and a sixth terminal connected to the fourth terminal and the fifth terminal.

As the detection portion is constituted of third and fourth terminals provided on the first connector and fifth and sixth terminals provided on the second connector, the cost would not increase significantly.

Preferably, the first reference potential is ground potential.

Then, as the first reference potential can be obtained simply by grounding the third terminal, the structure is simplified and the cost would not increase significantly.

Preferably, the second reference potential is the power supply potential via a pull-up resistance.

Then, as the second reference potential can be obtained simply by pulling up the potential on the fourth terminal, the structure is simplified and the cost would not increase significantly.

Preferably, after the detection portion detects that the sheet feeding device has been mounted, the control portion causes the supply portion to start the supply of the power after an elapse of a predetermined time.

Then, even when the sheet feeding device is engaged for an instant, the supply of the power by mistake can be prevented.

Preferably, third and fourth terminals are arranged at opposite ends of the first connector and, fifth and sixth terminals are arranged at opposite ends of the second connector.

Through the arrangement of third and fourth terminals and fifth and sixth terminals at the ends of the opposite sides of first and second connectors, respectively, the power supply to the sheet feeding device can be prevented from being started when the sheet feeding device is not correctly engaged with the image reading unit.

Preferably, first and second connectors have a plurality of rows of terminals.

The device is applicable even when the number of signals transmitted between the image reading unit and the sheet feeding device increases.

BEST MODES FOR CARRYING OUT THE INVENTION

An image scanner will be described hereinbelow as an example of the image reading devices, however, the present invention is not limited thereto and of course applicable to other image reading devices.

Figure 1:
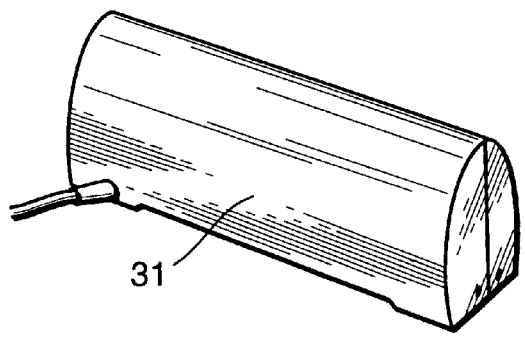
FIG. 1 is a perspective view showing an outer structure of a main scanner body 31 according to the present invention.

FIGS. 1 to 4 show an exemplary structure of a main scanner body employing the present invention. As shown in FIG. 1, a predetermined amount of power is supplied to a main scanner body 31 via a cable. Alternatively, a built-in battery can be provided in main scanner body 31 to eliminate the cable.

Figure 2:
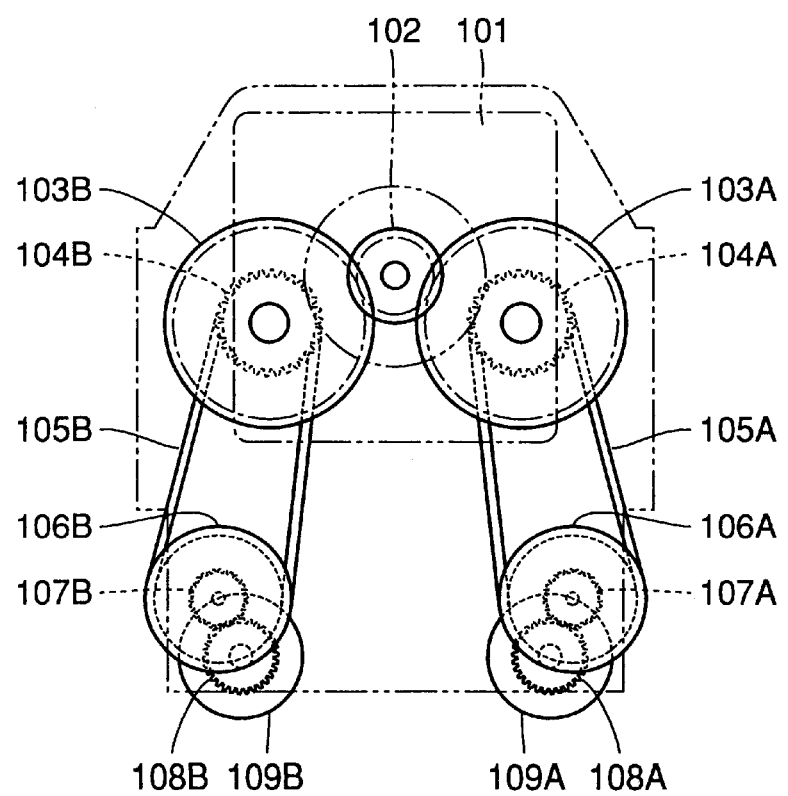
FIG. 2 is a side view showing a structure of a drive system in a main scanner body 31 shown in FIG. 1.
Figure 3:
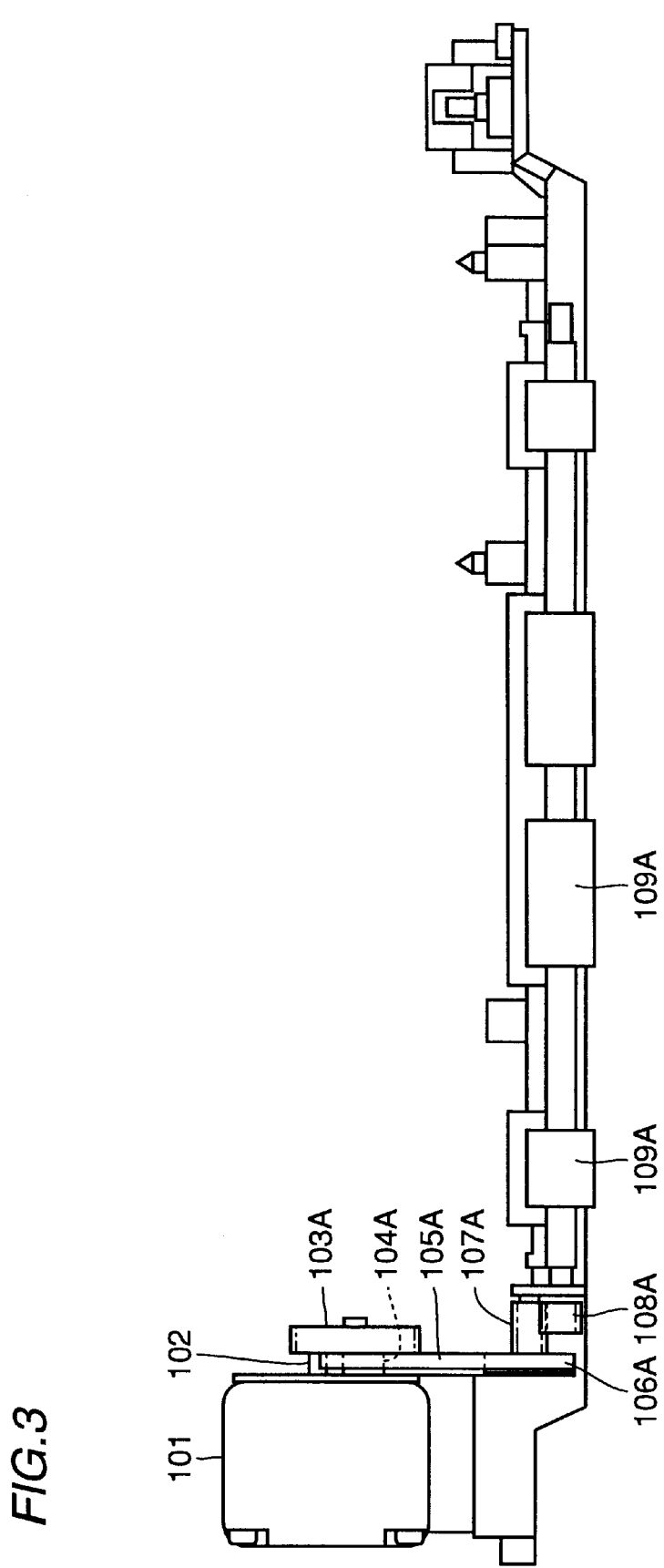
FIG. 3 is a front view showing a structure of a drive system in a main scanner body 31 shown in FIG. 1.

A motor 101 is driven with the use of power supplied via the cable. As shown in FIGS. 2 and 3, the rotation of motor 101 is transmitted to gears 103A and 103B via a gear 102 attached to a rotation axis of motor 101. To gears 103A and 103B, pulleys 104A and 104B are coupled, respectively, in a coaxial manner. The rotation of pulleys 104A and 104B are transmitted to pulleys 106A and 106B via belts 105A and 105B, respectively. Further, to pulleys 106A and 106B, gears 107A and 107B are coupled in a coaxial manner. To gears 107A and 107B, gears 108A and 108B are engaged. In addition, to gears 108A and 108B, transfer rollers 109A and 109B are provided, respectively, in a coaxial manner.

Thus, when motor 101 rotates, the rotation is transmitted via gear 102, gear 103A, pulley 104A, belt 105A, pulley 106A, gear 107A and gear 108A, and the transfer roller 109A rotates in the same direction as motor 101. Similarly, the rotation of motor 101 is transmitted to transfer roller 109B via gear 102, gear 103B, pulley 104B, belt 105B, pulley 106B, gear 107B and gear 108b, and transfer roller 109B also rotates in the same direction as motor 101.

Figure 4:
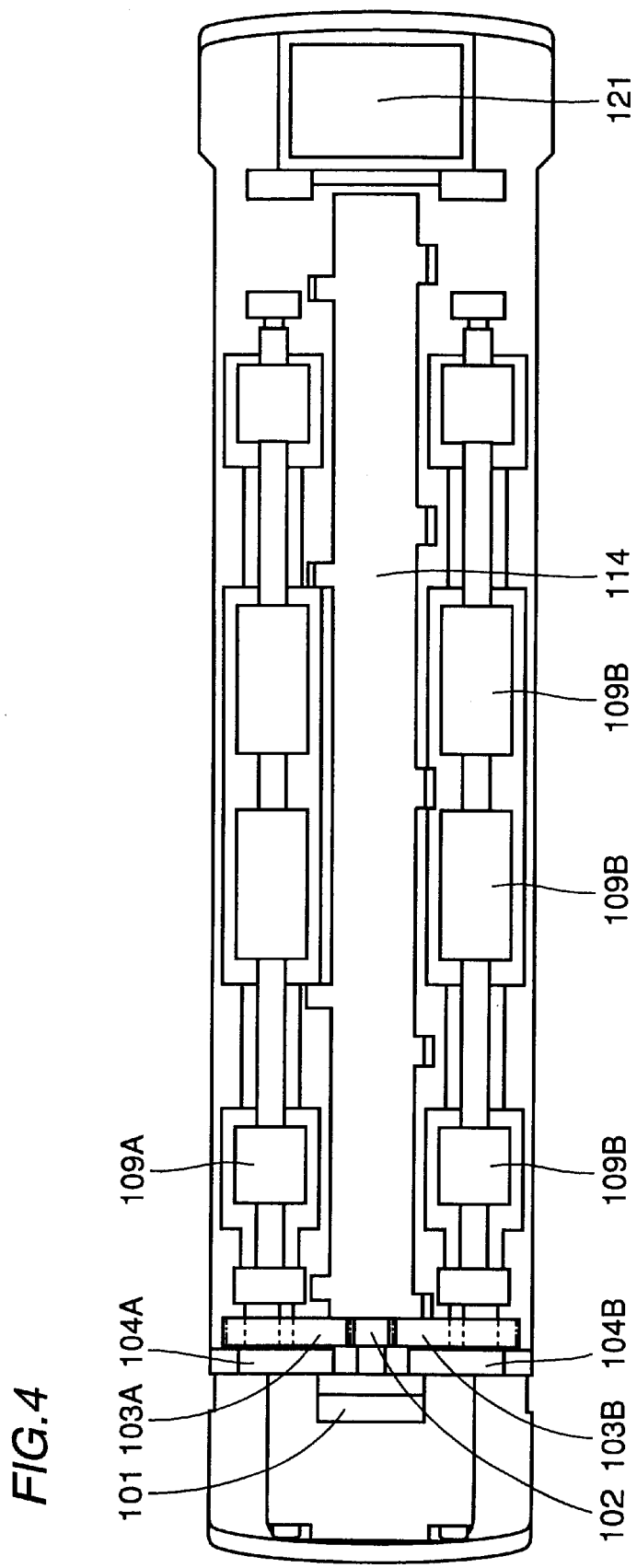
FIG. 4 is a bottom view showing a structure of a drive system in a main scanner body 31 shown in FIG. 1.

Thus, the rotation of motor 101 causes the rotation of transfer rollers 109A and 109B, and allows main scanner body 31 to freely run on the original not shown. In addition, as shown in FIG. 4, on a bottom surface of main scanner body 31, a reading portion 114 is provided which reads the image of the original.

Alternatively, main scanner body 31 can be mounted on the feeder. In this case, the feeder transfers the original and the image of the original being fed is read by reading portion 114.

Figure 5:
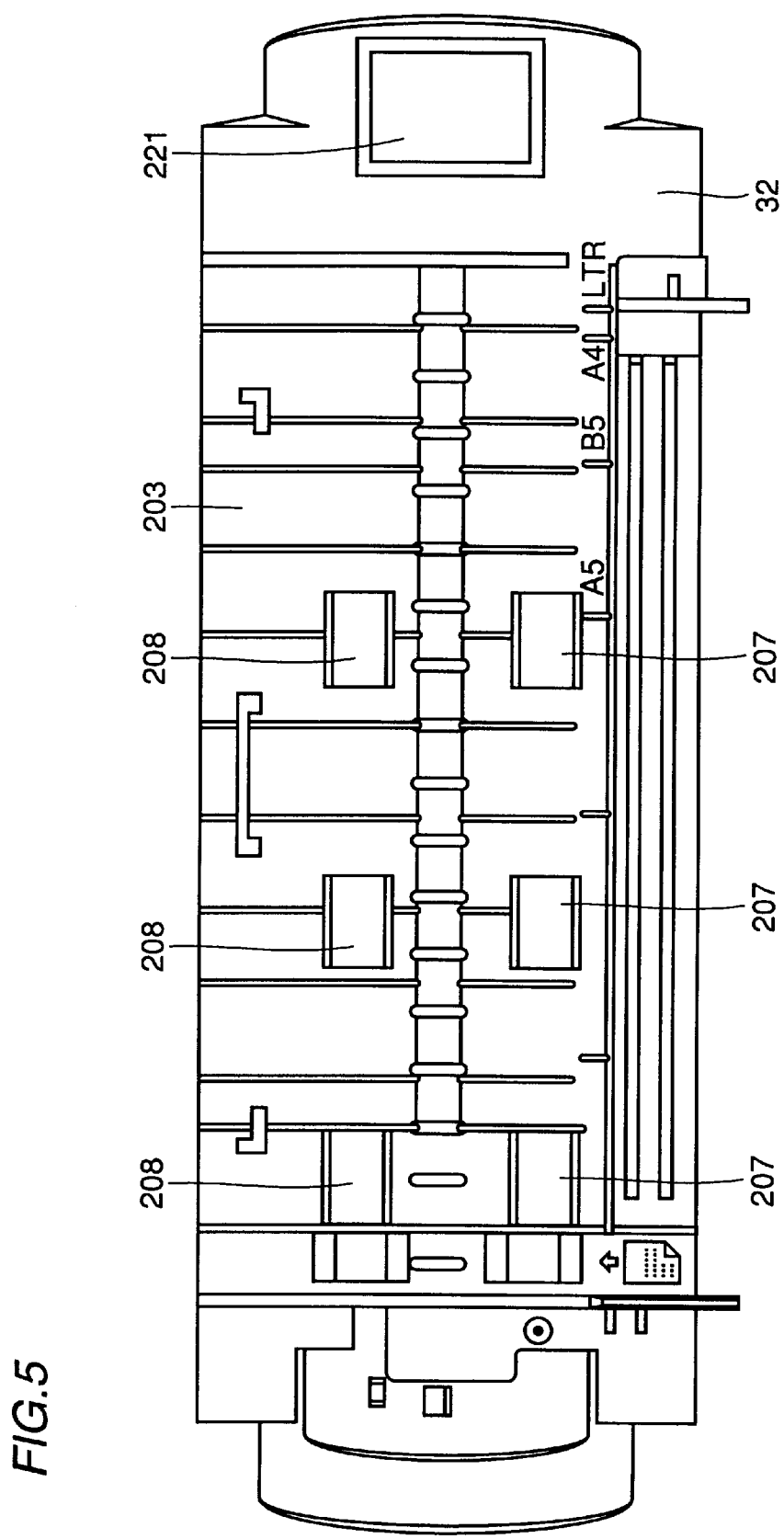
FIG. 5 is a plan view showing a structure of a feeder 32.
Figure 6:
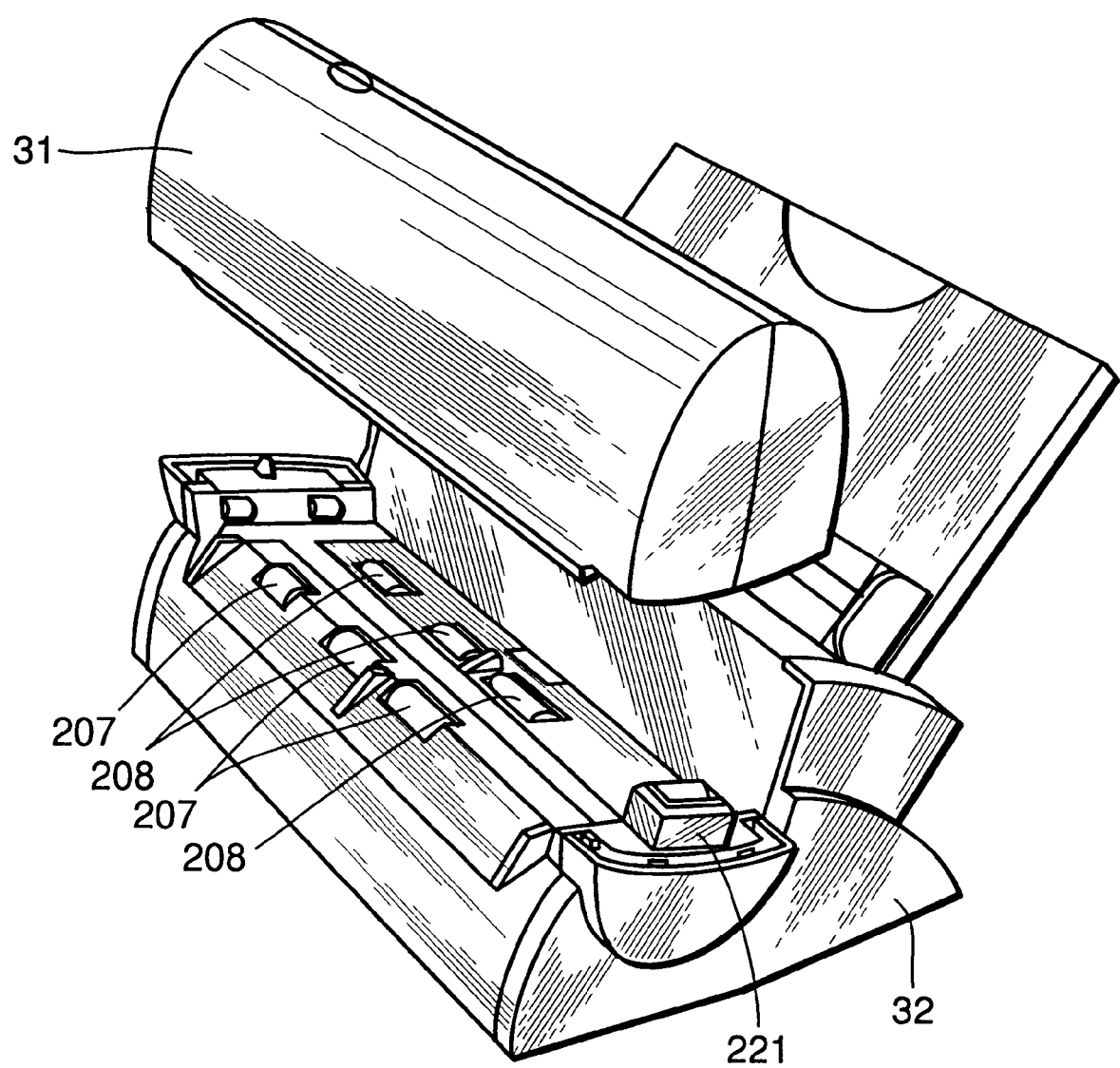
FIG. 6 is a perspective view showing a device in a state before a main scanner body 31 is mounted on a feeder 32.
Figure 7:
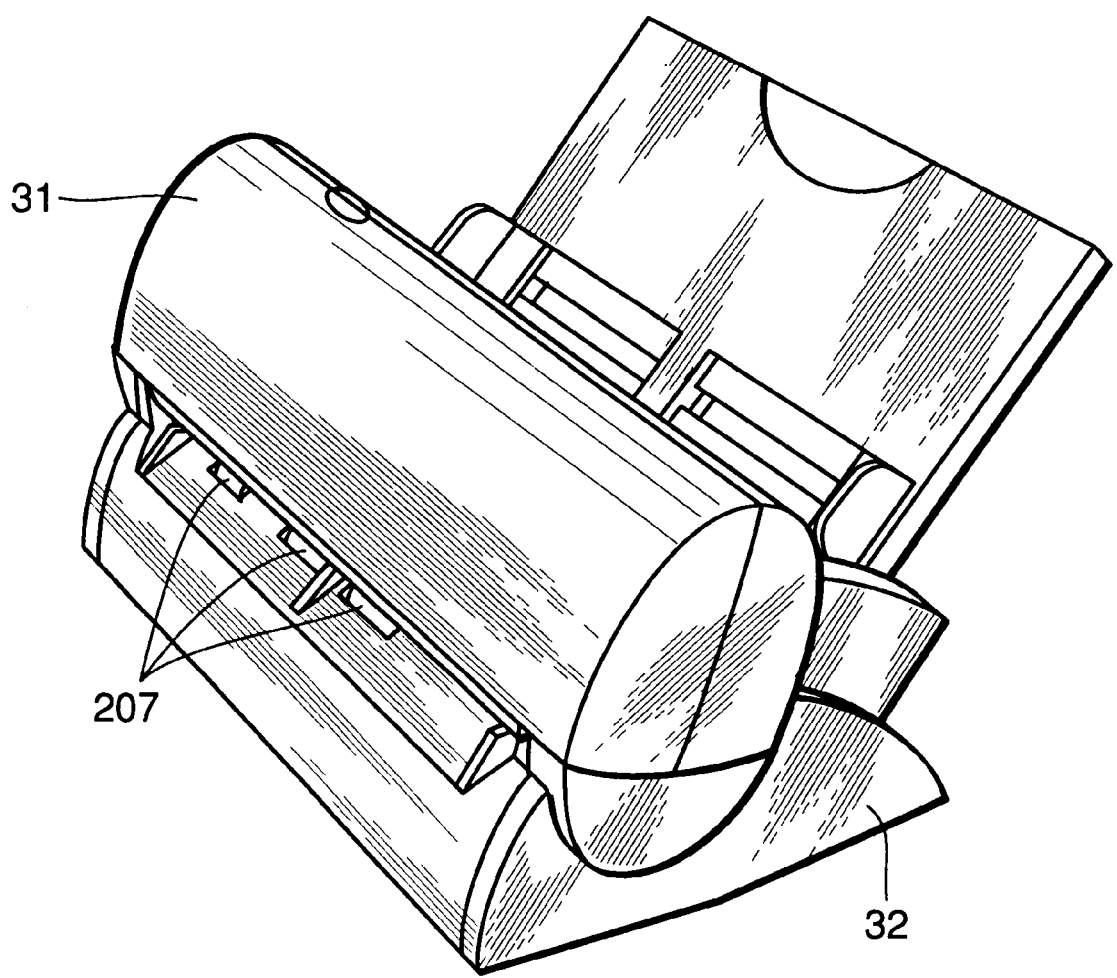
FIG. 7 is a perspective view showing a state after a main scanner body 31 is mounted on a feeder 32.

FIG. 5 is a plan view showing the structure of feeder 32 as described above. Transfer rollers 207 and 208 are driven by a motor 301 (see FIG. 8) as described later and rotate. Then, transfer rollers 109A and 109B of main scanner body 31 cooperate with transfer rollers 207 and 208 of feeder 32 to transfer the original sandwiched between these rollers. A connector 221 of feeder 32 is connected to a connector 121 of main scanner body 31 when main scanner body 31 is mounted on feeder 32. FIG. 6 shows the state before main scanner body 31 is mounted on feeder 32 and FIG. 7 shows the state after main scanner body 31 is mounted on feeder 32.

Figure 8:
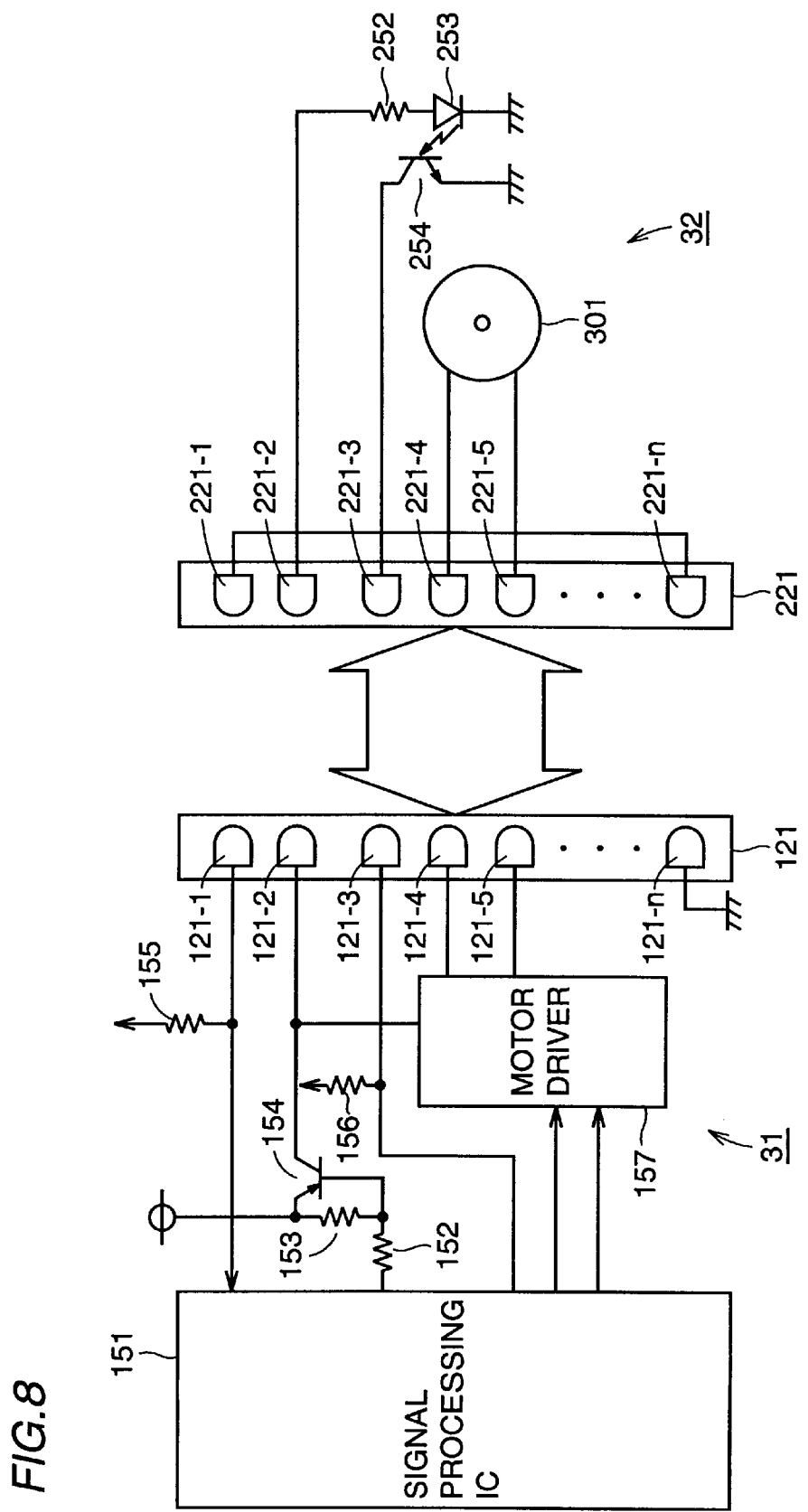
FIG. 8 is a circuit diagram showing a state of an electric connection between a main scanner body 31 and a feeder 32.

FIG. 8 shows a state of an electrical connection achieved through the connection of connector 121 and connector 221. Main scanner body 31 includes a signal processing IC 151 (control portion) processing various signals. Signal processing IC 151 is realized by a one-chip microcomputer, for example.

Signal processing IC 151 polls the change in potential of terminal 121-1 (a fourth terminal) located at one end among terminals 121-1~121-n of connector 121, using terminal 121-1 as a monitor terminal. Terminal 121-1 is supplied with a predetermined potential (power supply potential, for example) via a pull-up resistance 155. Terminal 121-2 (a first terminal) is supplied with a predetermined power via a PNP transistor 154. To the base of PNP transistor 154, a predetermined power supply voltage is applied via a resistance 153. Signal processing IC 151 controls the potential on the base of PNP transistor 154 to turn on/off PNP transistor 154.

Terminal 121-3 is supplied with a predetermined potential (power supply potential, for example) via a pull-up resistance 156. Signal processing IC 151 detects a signal from feeder 32 as a change in the potential of terminal 121-3. Motor driver 157 supplies a signal to terminals 121-4 and 121-5 and drives a motor 301 mounted on feeder 32. When PNP transistor 154 is turned on, a necessary power is supplied to motor driver 157 and motor driver 157 is controlled by signal processing IC 151. Here, terminal 121-n (a third terminal) located at another end of connector 121 is grounded.

Connector 221 of feeder 32 has terminals 221-1~221-n and terminal 221-1 (a sixth terminal) located at one end and terminal 221-n (a fifth terminal) located at another end are mutually connected. When main scanner body 31 is mounted on feeder 32, terminal 121-1 and terminal 121-n of connector 121 are connected via terminals 221-1 and 221-n of connector 221.

A resistance 252 and a light-emitting diode 253 are connected in series at terminal 221-2 (a second terminal) of connector 221 connected to terminal 121-2 of connector 121. To terminal 221-3 of connector 221 to be connected to terminal 121-3 of connector 121, a photo transistor 254 is connected. The conduction state of photo transistor 254 is controlled according to a light emitted from light emitting diode 253.

Hereinbelow, terminals 121-1 and 121-$n$ of connector 121 and terminals 221-1 and 221-$n$ of connector 221 are referred to as monitor terminal (detection portion), and terminals 121-2 of connector 121 and terminal 221-2 of connector 221 are called supply portion.

Though not shown in the figures, a lever having a slit is provided between light emitting diode 253 and photo transistor 254. When the original is put on feeder 32, the lever rotates and the light generated by light emitting diode 253 is directed onto photo transistor 254 through the slit of the lever. Thus, the sensor for detecting the mounting of the original is formed. In addition, motor 301 is connected to terminals 221-4 and 221-5 of connector 221 connected to terminals 121-4 and 121-5 of connector 121, respectively.

Though not shown, other signals are input/output via other terminals of connectors 121 and 221.

Figure 9:
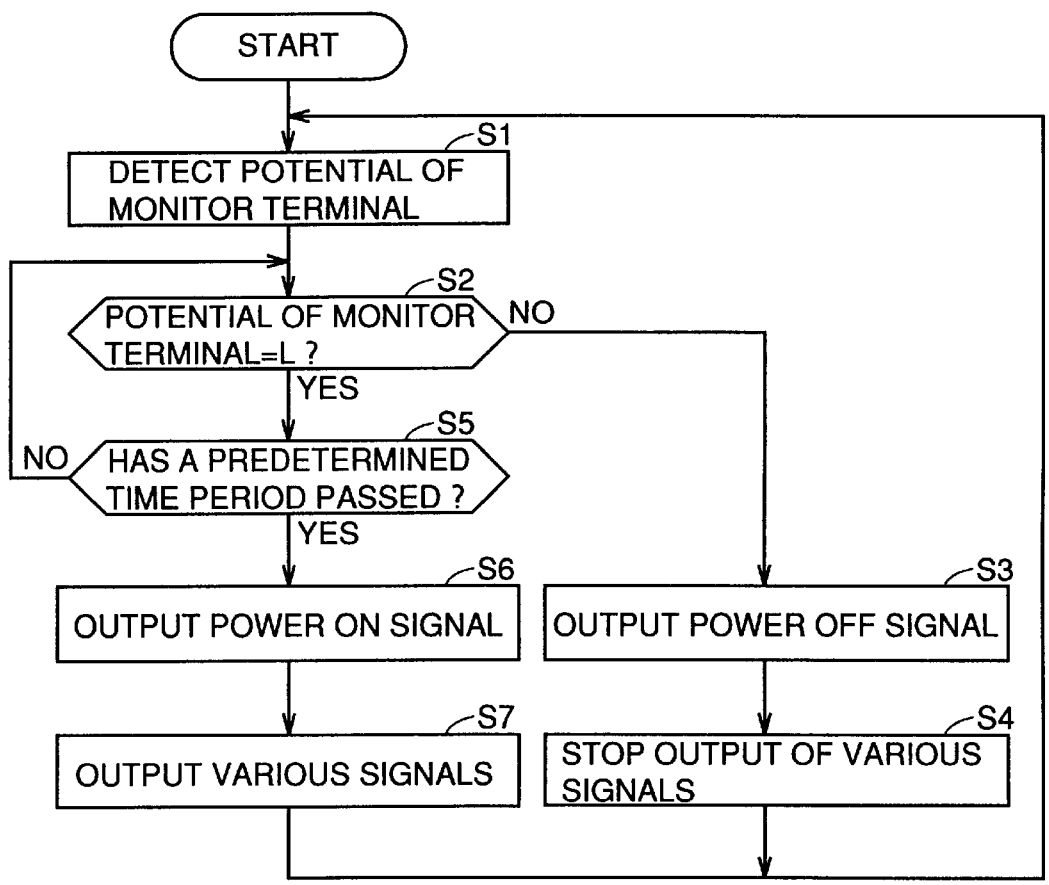
FIG. 9 is a flow chart referenced for describing an operation of an image scanner according to the embodiment.

Next, with reference to a flow chart of FIG. 9, an operation of the image scanner according to the embodiment will be described. Signal processing IC 151 detects the potential of terminal 121-1 by polling terminal 121-1 as a monitor terminal (S1). When main scanner body 31 is not mounted on feeder 32, terminal 121-1 is open. Hence, terminal 121-1 attains a high level due to the effect of pull-up resistance 155. On the other hand, when main scanner body 31 is mounted on feeder 32 and connectors 121 and 221 are mutually connected, terminals 121-1~121-$n$ and terminals 221-1~221$n$ are mutually connected. As a result, terminal 121-1 is grounded through a path of terminals 221-1, 221-$n$ and 121-$n$ and attains a low level.

Next, signal processing IC 151 determines whether the potential at terminal 121-1 which is detected in step S1 is at a low level or not (S2). When the potential is not at a low level (NO in S2), feeder 32 is determined to be separated from main scanner body 31, and a power off signal is supplied to PNP transistor 154 (S3). Specifically, signal processing IC 151 supplies a signal at a high level to a terminal connected to one end of resistance 152. As a result, a potential at a high level is applied to the base of PNP transistor 154 via resistance 153 and then PNP transistor 154 is turned off. Therefore, no power is supplied from terminal 121-2 and no power is supplied to motor driver 157. Then, signal processing IC 151 stops the output of various signals (S4). For example, to motor driver 157, no control signal is supplied and no signal input/output is performed through terminal of connector 121.

As can be seen from the above, when main scanner body 31 is not mounted on feeder 32, the process from step S1 to S4 is repeated.

On the other hand, when main scanner body 31 is mounted on feeder 32, the potential on terminal 121-1 attains a low level as described above. On detection of the transition of potential on terminal 121-1 to a low level (YES in S2), signal processing IC 151 stands by for a predetermined time period (S5). After the elapse of a predetermined time period, signal processing IC 151 supplies a power on signal as an output (S6). Specifically, signal processing IC 151 supplies a signal of a low level to a terminal connected to one end of resistance 152. Then, the base of PNP transistor 154 attains a potential lower than the potential on the emitter and PNP transistor 154 is turned on. As a result, power is supplied to terminal 121-2 and the power is supplied to resistance 252 and light emitting diode 253 via terminal 221-2 of connector 221. Then light emitting diode emits the light.

When the original is not mounted on feeder 32, the light emitted from light emitting diode 253 is blocked by the lever and does not enter photo transistor 254. Hence, the potential of terminal 121-3 remains at a high level with a voltage of a high potential being applied via pull-up resistance 156. Signal processing IC 151 is capable of detecting that the original is not mounted through the detection of the high level potential on the terminal connected to pull-up resistance 156.

When the original is mounted, the lever rotates and the light emitted by light emitting diode 253 is directed onto photo transistor 254 through the slit of the lever. As a result, photo transistor 254 is turned on and terminal 121-3 is grounded via terminal 221-3 and photo transistor 254. Thus, the potential on terminal 121-3 attains a low level and signal processing IC 151, detecting the low level signal on the terminal connected to pull-up resistance 156, can detect that the original is mounted on feeder 32.

Finally, signal processing IC 151 supplies various signals as outputs (S7). For example, when motor 301 is to be driven, a control signal is supplied to motor driver 157. Motor driver 157 is responsive to the control signal to drive motor 301 via terminal 121-4, terminal 221-4, motor 301, terminal 221-5 and terminal 121-5.

Here, the process is suspended for a predetermined time period at step S5 in order to prevent the supply of power through accidental and instantaneous short circuit of terminal 121-1 and terminal 121-$n$ due to some reason.

Figure 10:
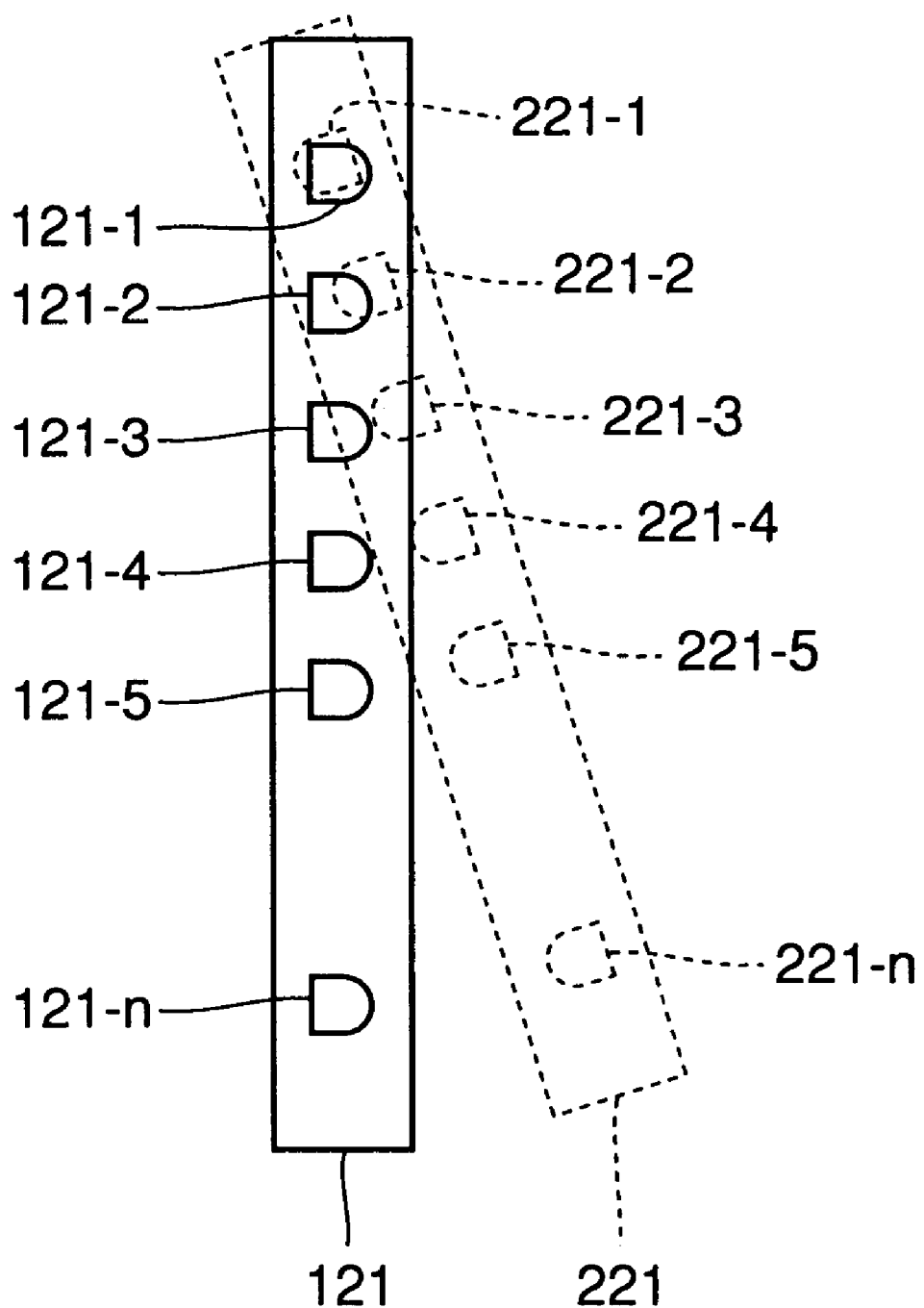
FIG. 10 is a diagram referenced for describing a state of connection of connectors.

FIG. 10 shows a state of mal connection of connector 121 and connector 221. Even when connector 121 and connector 221 are not connected correctly, two terminals 121-1 and 121-2 located close to each other can be connected to terminals 221-1 and 221-2, respectively. Here, provided that the monitor terminal of connector 121 is terminals 121-1 and 121-2 and the monitor terminal of connector 221 is terminals 221-1 and 221-2, main scanner body 31 and feeder 32 can be mistakenly determined to be engaged with each other even when correct engagement is not achieved. On the other hand, when the terminals located at the opposite ends (terminals the distance therebetween is the longest) of connector 121 and connector 221 are employed as the monitor terminals, as described above, these monitor terminals are unlikely to be connected to each other unless two connectors are correctly engaged with each other. Thus, even when these connectors are not correctly engaged, erroneous determination on the engagement can be prevented.

When main scanner body 31 is to be removed from feeder 32, first, terminals 121-1 and 221-1 in a connected state, or terminals 121-$n$ and 221-$n$ in a connected state are disconnected. Hence, the removal of main scanner body 31 from feeder 32 can be detected even when other terminals are still in a connected state and the generation of an electric shock can be prevented by immediate suspension of power supply to feeder 32.

Figure 11:
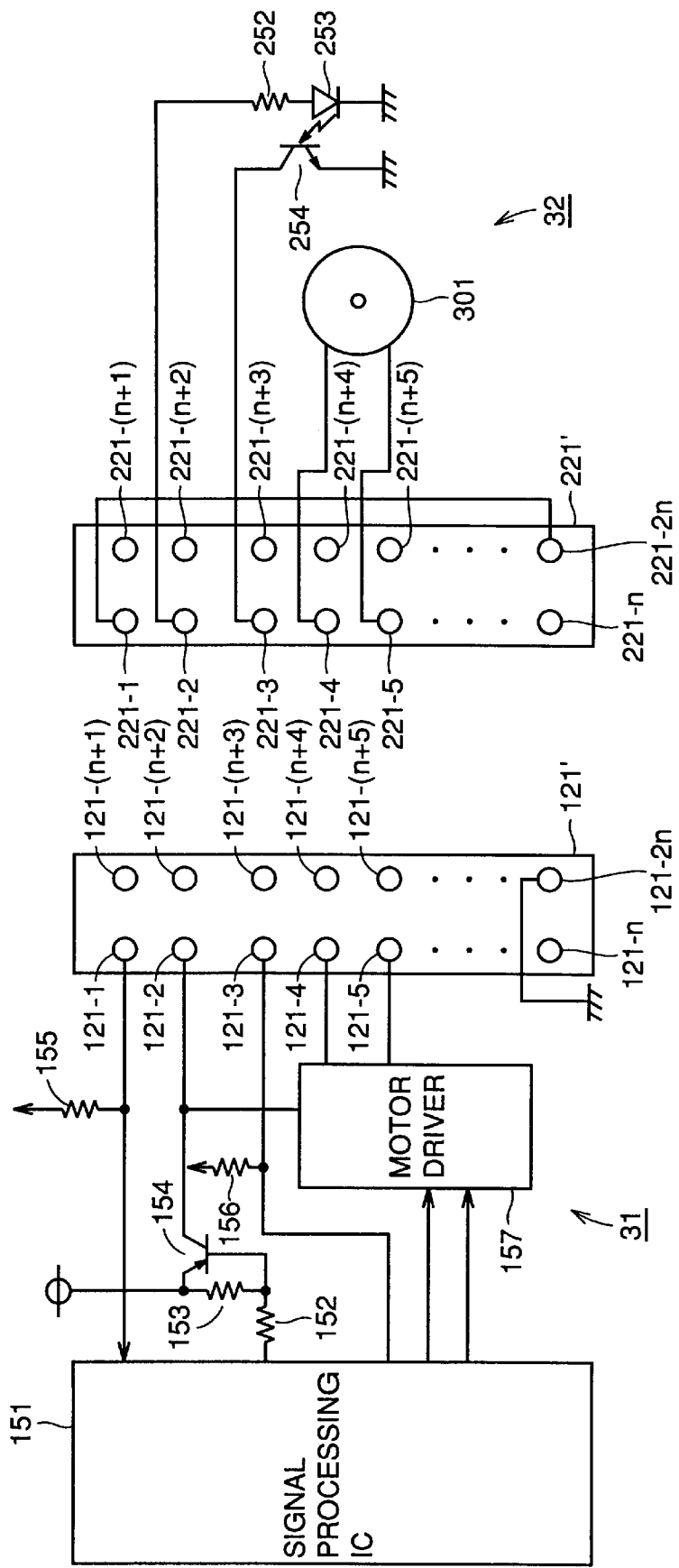
FIG. 11 is a circuit diagram showing another state of electric connection between a main scanner body 31 and a feeder 32.

FIG. 11 shows another exemplary structure of connectors 121 and 221. In this exemplary structure, pins of each connector are arranged in two rows. In this case again, terminals located at the ends are employed as the monitor terminals. In a connector 121', terminals 121-1 and 121-2$n$ are employed as monitor terminals. In a connector 221', terminals 221-1 and 221-2$n$ are employed as monitor terminals. A terminal 121-$n$ can be used as the monitor terminal in place of terminal 121-2n and, a terminal 221-n can be used as the monitor terminal in place of terminal 221-2n. Needless to say, the present invention is applicable in the case where pins of each connector are arranged in three rows.

Thus, though the application of the present invention in the image scanner has been described as an example, the present invention is applicable to other image reading devices in which an image reading unit and a sheet feeding device are electrically connected via a connector as well.

As can be seen from the foregoing, in the image reading device according to the present invention, as the attachment/detachment of the sheet feeding device is detected by the detection portion and the supply of the power by the supply portion is controlled according to the result of detection by the detection portion, the electric shock on the internal circuit of the sheet feeding device can be prevented even when the user mounts the sheet feeding device on the image reading unit without turning off the power supply switch of the image reading unit. In addition, the structure for achieving the same is simple as described above and the cost increase is insignificant.

What is claimed is:

1. An image reading device including an image reading unit (31) being supplied with power and a sheet feeding device (32) being supplied with power from said image reading unit (31) when being mounted on said image reading unit (31), comprising:

a detection portion (121-1, 121-n, 221-1, 221-n) detecting the attachment/detachment of said sheet feeding device (32); and a supply portion (121-2, 221-2) supplying power to said sheet feeding device (32), said sheet feeding device (32) including a drive portion (301) feeding a sheet of paper, said image reading unit (31) including a control portion (151) controlling the supply of the power by said supply portion (121-2, 221-2) according to the result of detection by said detection portion (121-1, 121-n, 221-1, 221-n) and a drive signal output portion (157) supplying a drive signal as an output to said drive portion (301).

2. The image reading device according to claim 1 wherein said image reading unit (31) includes a first connector (121), said sheet feeding device (32) includes a second connector (221) connected to said first connector (121), said supply portion (121-2, 221-2) includes a first terminal (121-2) provided on said first connector (121) and supplying power to said sheet feeding device (32) and a second terminal (221-2) provided on said second connector (221), connected to said first terminal (121-2) and supplied with power.

3. The image reading device according to claim 2 wherein said detection portion (121-1, 121-n, 221-1, 221-n) includes a third terminal (121-n) provided on said first connector (121) and connected to a first reference potential, and a fourth terminal (121-1) connected to a second reference potential of a different level from said first reference potential and a potential thereon changes from said second reference potential when said second connector (221) is connected, a fifth terminal (221-n) provided on said second connector (221) and connected to said third terminal (121-n), and a sixth terminal (221-1) connected to said fourth terminal (121-1) and to said fifth terminal (221-n).

4. The image reading device according to claim 3 wherein said first reference potential is a ground potential.

5. The image reading device according to claim 3 wherein said second reference potential is a power supply potential via a pull-up resistance.

6. The image reading device according to claim 3 wherein said third terminal (121-n) and said fourth terminal (121-1) are arranged at opposing ends of said first connector (121), respectively and said fifth terminal (221-n) and said sixth terminal (221-1) are arranged at opposing ends of said second connector (221), respectively.

7. The image reading device according to claim 6 wherein said first connector (121) and said second connector (221) each include terminals arranged in a plurality of rows.

8. The image reading device according to claim 1 wherein said control portion (151) causes said supply portion (121-2, 221-2) to start the supply of the power after an elapse of a predetermined time period after said detection portion (121-1, 121-n, 221-1, 221-n) detects that said sheet feeding device (32) has been mounted.

9. The image reading device according to claim 1 wherein said drive portion (301) is a motor and said drive signal output portion (157) is a motor driver.

* * * * *